UNITED STATES PATENT OFFICE.

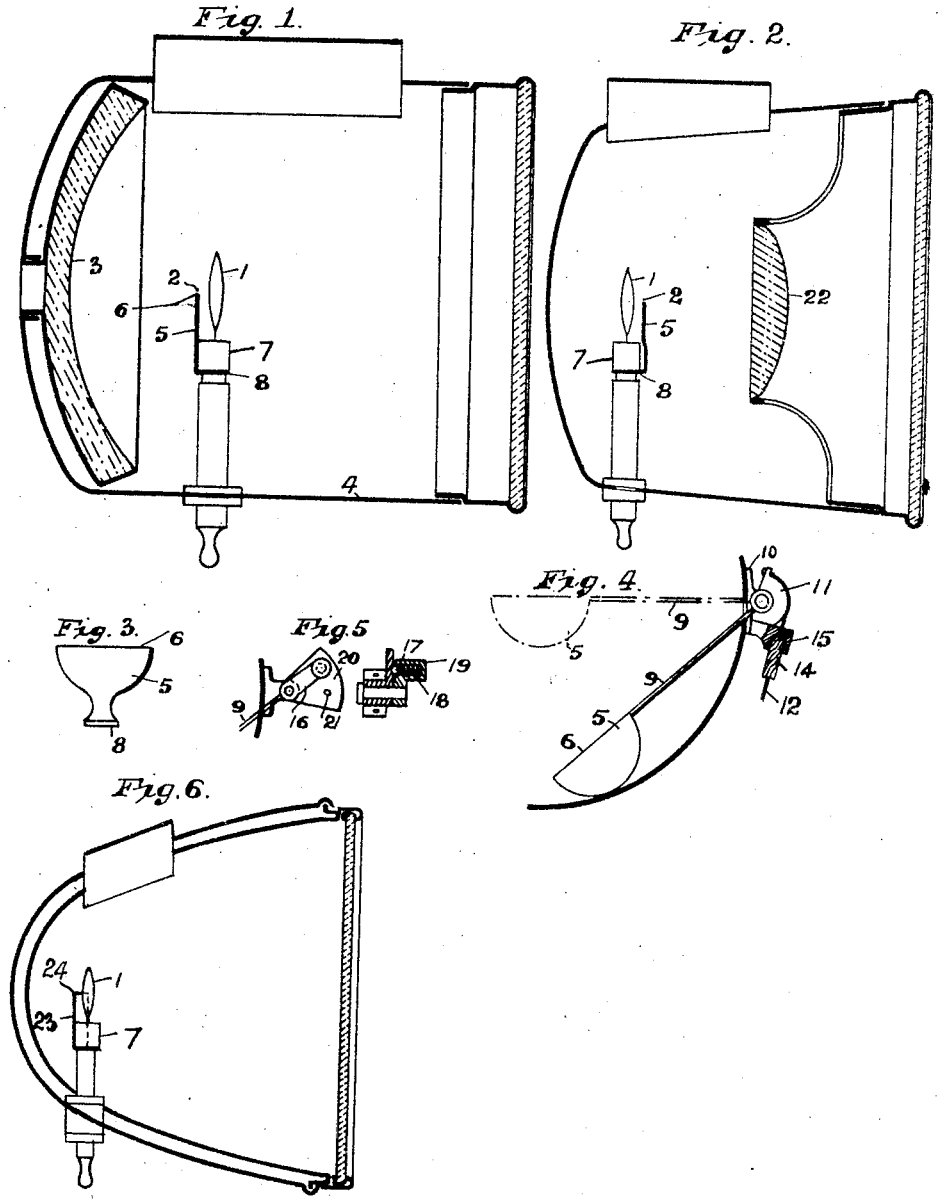

WALTER CECIL MANTBY PETTINGILL, OF BIRMINGHAM, ENGLAND.

LAMP.

1,108,227.  Specification of Letters Patent.  Patented Aug. 25, 1914.

Application filed May 19, 1913.  Serial No. 768,548.

*To all whom it may concern:*

Be it known that I, WALTER CECIL MANTBY PETTINGILL, subject of the King of Great Britain, residing at 47 Francis road, Edgbaston, Birmingham, in the county of Warwick, England, have invented a new and useful Lamp; and I do hereby declare the following to be a full, clear, and exact description of the same.

This invention comprises improvements in and relating to anti-glare devices for lamps fitted with reflectors, or with lenses, or with reflectors and lenses, and it has for its object an anti-glare device or arrangement which will be simple in construction and which will not diminish the useful light emitted by the lamp.

The invention is very useful in connection with the lamps used on motor vehicles.

According to this invention, those rays from the source of light which normally give rise to upper reflections are intercepted or obviated and thereby prevented from reaching the reflecting medium or media.

In one way of carrying out this invention, I so position or group a screen or screens in relation to the source of light as to intercept rays which give rise to undesirable upper reflections and thereby prevent said rays from reaching the reflecting medium or media. In another way of carrying out this invention, the source of light is so shaped and positioned in the focal plane of the lamp as to emit rays which when reflected from the reflecting medium or media constitute an illumination lacking the undesirable upper rays. In both these methods, the light projected by the lamp has a well-defined upper edge and the amount of restriction imposed on the projected light can be varied as required, the volume of useful light below the umbra thus created being unimpaired.

My invention can be carried into practice in various ways, some examples being illustrated on the accompanying drawing on which:

Figure 1 is a sectional elevation of a lamp fitted with a rear reflector showing my invention applied thereto. Fig. 2 is a sectional elevation of a lamp fitted with a front lens with my invention applied thereto. Fig. 3 is an elevation at right angles to Fig. 1 showing the screen. Fig. 4 is a fragmentary view showing means for operating the screen. Fig. 5 is another fragmentary view showing a modification of the screen operating means. Fig. 6 is a sectional elevation of a lamp fitted with a parabolic reflector showing the application of the invention to that type of lamp.

In the lamp shown in Fig. 1, the flame 1 or other source of illumination is arranged slightly in front of the true focus 2 of the reflector 3 of the concave type of the lamp 4, and in the focal plane close behind the source of light 1 is located a small screen 5 made of metal or other suitable material. Preferably the screen is of semi-circular shape with the straight edge 6 uppermost and is preferably disposed so that such straight edge 6 is slightly below the horizontal axis of the reflector 3, the dimensions of the screen being such as will stop the passage of rays from the light source below the said straight edge 6. By this means, the upper rays of the cone of light normally projected by the lamp are cut off in a sharply defined manner without appreciably affecting the strength of the other rays, this being due to the fact that the area of the screen is small in comparison with that of the reflector. The screen may be shaped to cut off any desired rays of the cone of light and to leave any others, the fact being kept in view that if the lamp be directed to illuminate a distant plane, an inverted image of the screen in shadow will be formed thereon, as the screen is in the focal plane of the reflector.

It is not essential that the light source and the screen be arranged as described, as by locating them a little in front of or to the rear of the positions specified, the cutting off of the rays merely becomes a little less sharply defined.

Instead of fixing the screen 5 to the burner 7 by a horizontal perforated eye 8 as in Fig. 1, it may be fixed to the body of the lamp, or as shown in Fig. 4 may be mounted on a lever arm 9 pivoted to a bracket 10 fixed to the lamp body. In this case, the screen 5 is capable of being swung or displaced to a position in which it does not interfere with the passage of light to the reflector to any material extent, thereby allowing the driver of the vehicle to cut off the rays to any desired extent.

In Fig. 4, a quadrant 11 is attached to the pivoted lever 9 to accommodate the inextensible inner member 12 of a flexible cable the outer incompressible member 14 of which is anchored in a stop 15. The other end of the member 12 is connected to a lever under the control of the driver.

In Fig. 5, the pivoted lever 9 has an outwardly-extending part 16 furnished with a ball 17, spring 18 and spring box 19, said ball forming a detent to hold the pivoted lever 9 and attached screen 5 in either the operative position or the inoperative position. A quadrant 20 with depressions 21 is provided for engagement by the ball 17.

The application of the invention to a lamp of the type fitted with a lens in front of the source of light is illustrated in Fig. 2, in which a screen 5 is arranged just in front of the source of light 1 to cut off the upper rays of the cone of light from the front lens 22. As this screen is similar to that shown in Fig. 3, it is not further described.

In those lamps in which a parabolic reflector is used, see Fig. 6, the rear rays and also those which normally strike sidewise from the lower part of the light are screened by an annular segment 23 with straight upper edge 24, which subtends a suitable angle so as to surround the lower part of the source of light 1, the top straight edge 24 being just below the axis of the lamp.

Having thus described my invention, what I claim is:

1. In a lamp, the combination of a source of light, means for increasing the intensity of the projected beam, and a screen having a substantially horizontal upper edge and situated in the focal plane of the intensifying means, said screen lying wholly below the optical axis and close to said source of light so as to prevent the rays propagated by that part of the source of light which lies below the optical axis from reaching the intensifying means.

2. In a lamp, the combination of a source of light, refracting means arranged in front of said source of light, and a screen with a substantially horizontal upper edge, said screen being arranged close to and in front of said source of light and with its said edge substantially in or about the plane of the axis of the refracting means.

In testimony whereof, I have signed my name to this specification in the presence of two subscribing witnesses.

WALTER CECIL MANTBY PETTINGILL.

Witnesses:
NORMAN S. BARLOW,
WM. A. DAVIS.